United States Patent [19]

Kleinhenz et al.

[11] Patent Number: 5,040,972

[45] Date of Patent: Aug. 20, 1991

[54] PYROLYZER-KILN SYSTEM

[75] Inventors: Ned J. Kleinhenz, Beavercreek, Ohio; Alvin L. Gaunce, Pointe Claire, Canada; Robert A. Schmall, Temperance, Mich.; Thomas J. Schultz, Maumee, Ohio

[73] Assignee: Systech Environmental Corporation, Xenia, Ohio

[21] Appl. No.: 476,264

[22] Filed: Feb. 7, 1990

[51] Int. Cl.⁵ .............................................. F23G 5/12
[52] U.S. Cl. ..................................... 432/72; 432/36; 432/106; 110/229; 110/242
[58] Field of Search ...................... 432/36, 37, 72, 51, 432/106; 110/229, 101 C, 230, 242

[56] References Cited

U.S. PATENT DOCUMENTS

| | | |
|---|---|---|
| 3,849,061 | 11/1974 | Summer . |
| 3,909,953 | 10/1975 | Hemsath et al. ........................ 34/26 |
| 4,022,630 | 5/1977 | Watson et al. . |
| 4,077,763 | 3/1978 | Jäger et al. ........................ 432/36 X |
| 4,081,285 | 3/1978 | Pennell . |
| 4,092,098 | 5/1978 | Honaker et al. . |
| 4,092,128 | 5/1978 | Harris et al. . |
| 4,256,503 | 3/1981 | Tsuda et al. . |
| 4,270,898 | 6/1981 | Kelly ................................ 432/37 X |
| 4,295,823 | 10/1981 | Ogawa et al. . |
| 4,424,023 | 1/1984 | Matsuoka .......................... 432/36 X |
| 4,485,745 | 12/1984 | Bracker et al. ...................... 110/229 |
| 4,489,562 | 12/1984 | Snyder et al. .......................... 60/667 |
| 4,557,203 | 12/1985 | Mainord .......................... 432/37 X |
| 4,584,947 | 4/1986 | Chittick ........................... 110/229 X |
| 4,602,573 | 7/1986 | Tanca ................................ 110/342 |
| 4,627,877 | 12/1986 | Ogawa et al. . |
| 4,745,869 | 5/1988 | Dilmore et al. ................... 432/13 X |
| 4,751,886 | 6/1988 | Koptis et al. ..................... 432/37 X |
| 4,797,091 | 1/1989 | Neumann ........................ 110/229 X |
| 4,840,129 | 6/1989 | Jelinek; ............................... 110/229 |
| 4,846,081 | 7/1989 | Homer et al. ................. 110/101 C X |
| 4,913,069 | 4/1990 | Shultz et al. .................... 110/229 X |
| 4,924,785 | 5/1990 | Shultz et al. .................... 110/229 X |

OTHER PUBLICATIONS

Krupp Polysius, Process for the Energetical Utilization of Domestic Refuse in Rotary Kiln Systems (1987).

Primary Examiner—Henry A. Bennet
Assistant Examiner—Christopher Kilner
Attorney, Agent, or Firm—Thompson, Hine and Flory

[57] ABSTRACT

A pyrolyzer-kiln system for generating combustible fume from waste material and supplementing the fuel used to provide heat energy to a clinker kiln. The system includes a pyrolyzer for generating a combustible pyrolytic fume, a kiln for burning the fume as part of a cement-forming process, a conduit for conveying the fume from the pyrolyzer to the kiln, and a closed-loop feedback component for monitoring the heating value of the fume and varying the operational parameters of the pyrolyzer to maintain the heating value of the fume generated within a predetermined range. The closed-loop feedback component includes a calorimeter which continuously samples and burns fume from the conduit. The heating value of the fume is determined by measuring the amount of auxiliary fuel and air required to be mixed with the fume to maintain a predetermined temperature when the combustion is burned within the calorimeter. Controllers monitor the amount of auxiliary fuel and air supplied to the calorimeter and vary the temperature within the pyrolyzer to effect an increase or decrease in the heating value of the fume. The system also includes a burner pipe for injecting the fume into the kiln which has a variable orifice to maintain a constant pressure differential across the orifice and thereby maintain a predetermined flame shape as the fume is burned in the kiln.

35 Claims, 4 Drawing Sheets

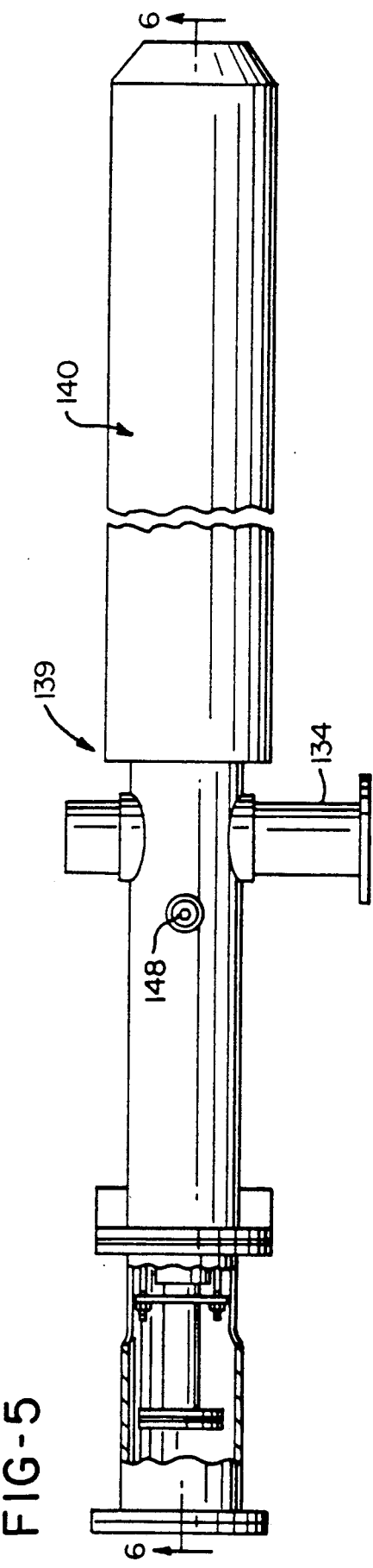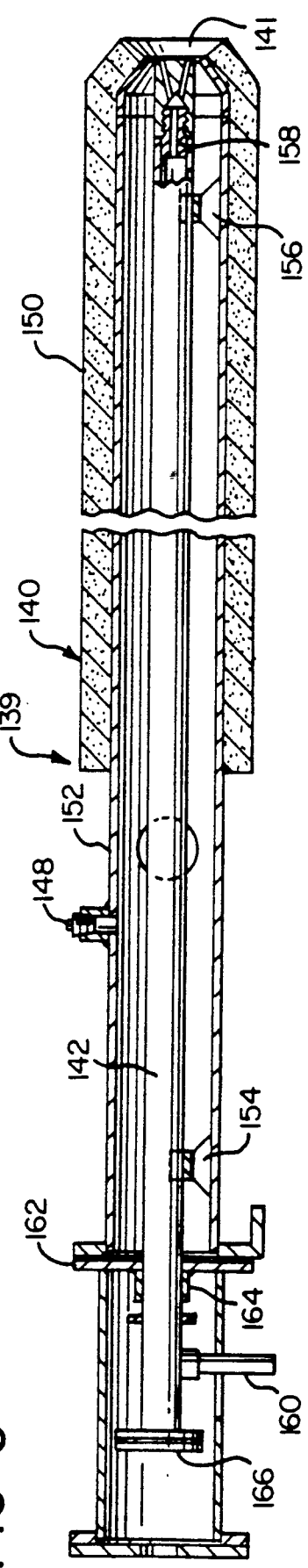

PYROLYZER-KILN SYSTEM

BACKGROUND OF THE INVENTION

The present invention relates to kiln fuel systems and, more particularly, kiln fuel systems which utilize combustible gas or fume generated by pyrolysis of waste material as a fuel source.

Pyrolysis is a well-known mechanism for treating toxic and otherwise hazardous waste having organic components. The waste material is heated in the absence of oxygen, or in an oxygen reduced atmosphere, to generate a combustible gas or fume. Since the pyrolysis of hazardous waste material generates combustible fume, it is appropriate to utilize a pyrolytic process to generate a combustible fume to be used as a fuel source for other processes.

Accordingly, it would appear appropriate to combine a pyrolytic process with a clinker kiln or cement process, since the latter requires the input of large amounts of heat energy. For example, the Ogawa et al. U.S. Pat. Nos. 4,295,823 and 4,627,877 disclose a rotary kiln which generates hot exhaust gas to power a heat-decomposer, and the combustible gas generated in the heat decomposer is burned in a preheater or calcinator. However, there is no mechanism disclosed for regulating the amount of heat energy input to the calcinator by fume from the heat decomposer, except for regulating the rate and amount of material entering the heat decomposer.

However, in order to generate high-quality cement material in such processes, it is necessary to maintain a temperature in the kiln within a relatively narrow range. A disadvantage of using pyrolytic fume generated from waste material is that the heating value of the fume produced may vary considerably. Consequently, when such fume is piped to a kiln—or generated therein—and ignited to provide an auxiliary heat source, the rate of heat energy input to the kiln varies accordingly.

Since a cement kiln requires that the temperature of the process be maintained within a relatively narrow range, it is necessary to adjust the heat energy input of the main fuel supply to the kiln in response to the variations and heating value of the pyrolytic fume. However, the contents of the kiln during the process comprise a large mass which retains large amount of heat energy, and it is not possible to monitor the temperature of the kiln directly and make such adjustments since the amount of heat energy retained resists rapid temperature changes. Consequently, systems exist in which a pyrolytic fume is used as an auxiliary fuel source, but in order to maintain the heating value of the fume within a predetermined range, extensive pretreatment of the pyrolytic material is required. For example, one such system requires separation, precrushing, and sorting of material prior to the pyrolytic process.

Accordingly, there is a need for a kiln system which can take advantage of the economic benefits of pyrolysis of hazardous industrial waste material by using the combustible fume so generated as an auxiliary fuel source, but can maintain the heating value of the fume substantially constant in order to maintain the temperature within the kiln within a predetermined operating range, without extensive pretreatment of the pyrolytic material, which tends to reduce the cost-effectiveness of the process.

SUMMARY OF THE INVENTION

The present invention provides a pyrolyzer-kiln system in which a pyrolyzer is operated to generate a combustible fume used as an auxiliary fuel source for a kiln such that the fume has a heating value within a predetermined range so that the temperature within the kiln may be maintained within predetermined limits to ensure optimal operating conditions. The system includes a closed-loop feedback control component which continuously samples the pyrolytic fume generated and conveyed to the kiln, measures the heating value of the sample and adjusts the operational parameters of the pyrolyzer in response to variations in the heating value of the pyrogas generated from the fume. Specifically, the system includes a pyrolyzer, a kiln having a primary energy source such as a fossil fuel burner, a conduit for conveying pyrolytic fume from the pyrolyzer to the kiln, and the feedback control component. The fume is conveyed through the conduit by a fan, pump or the like positioned downstream of the feedback control component. The pyrolyzer may be of the type which operates either in a batch mode or a continuous feed mode.

In a preferred embodiment of the invention, the feedback control component includes a calorimeter which is connected to the conduit to draw a fume sample from it at a flow rate which is maintained at a constant ratio to the flow rate of the fume stream through the conduit. The fume sample is mixed with an auxiliary calorimeter fuel such as natural gas and ignited. The temperature of the flame generated within the calorimeter is maintained at a constant by a control which varies the flow rate of auxiliary fuel. A variable area jet pump draws the fume sample into the calorimeter, and the amount of air is varied by a controller which measures the pressures in the line which supplies fume to the calorimeter and in the conduit and maintains these pressures at a constant differential.

A control which measures the air and fuel flow to the calorimeter generates a signal which is proportional to the amounts of auxiliary fuel and air required to maintain the desired temperature, and that signal is conveyed to a main control. The main control varies the temperature within the pyrolyzer by varying the amount of fuel and combustion air supplied to the burners of the pyrolyzer. Such variations in the temperature within the pyrolyzer affect the heating value of the fume generated. Consequently, the main control varies the temperature within the pyrolyzer to maintain the heating value of the pyrolytic fume generated within the pyrolyzer and conveyed to the kiln within a predetermined range.

Also in the preferred embodiment, the fume is injected into the kiln through a burner which maintains a predetermined flame shape to give optimal performance to the cement forming process taking place within the kiln. The burner includes a housing having an open end positioned within the kiln and a pintle moveably positioned within the housing. The pintle varies in position with respect to the open end to vary the effective area of the end opening and thereby maintain a constant pressure differential across the opening of the housing. Fume is conveyed to the housing from the steam ejector pump and exits through the opening in the housing into the kiln.

Accordingly, it is an object of the present invention to provide a pyrolyzer-kiln system which is capable of performing a cement-forming operation within a predetermined temperature range in order to provide optimal conditions within the kiln; a pyrolyzer-kiln system which utilizes a pyrolyzer which may operate on a batch basis and which includes a closed-loop feedback component for maintaining the heating value of the pyrolytic fume produced within a predetermined range of values; and a pyrolyzer kiln system which is capable of utilizing hazardous industrial waste material to generate a combustible fume which may be utilized as fuel for the kiln.

Other objects and advantages of the invention will be apparent from the following description, the accompanying drawings and the appended claims.

BRIEF DESCRIPTION OF THE DRAWINGS

FIG. 5 is a top plan view, partially broken away, of the burner pipe of the pyrolyzer-kiln system of FIG. 1; and FIG. 6 is a side elevation in section of the burner pipe of FIG. 5.

DETAILED DESCRIPTION

Figure 1:
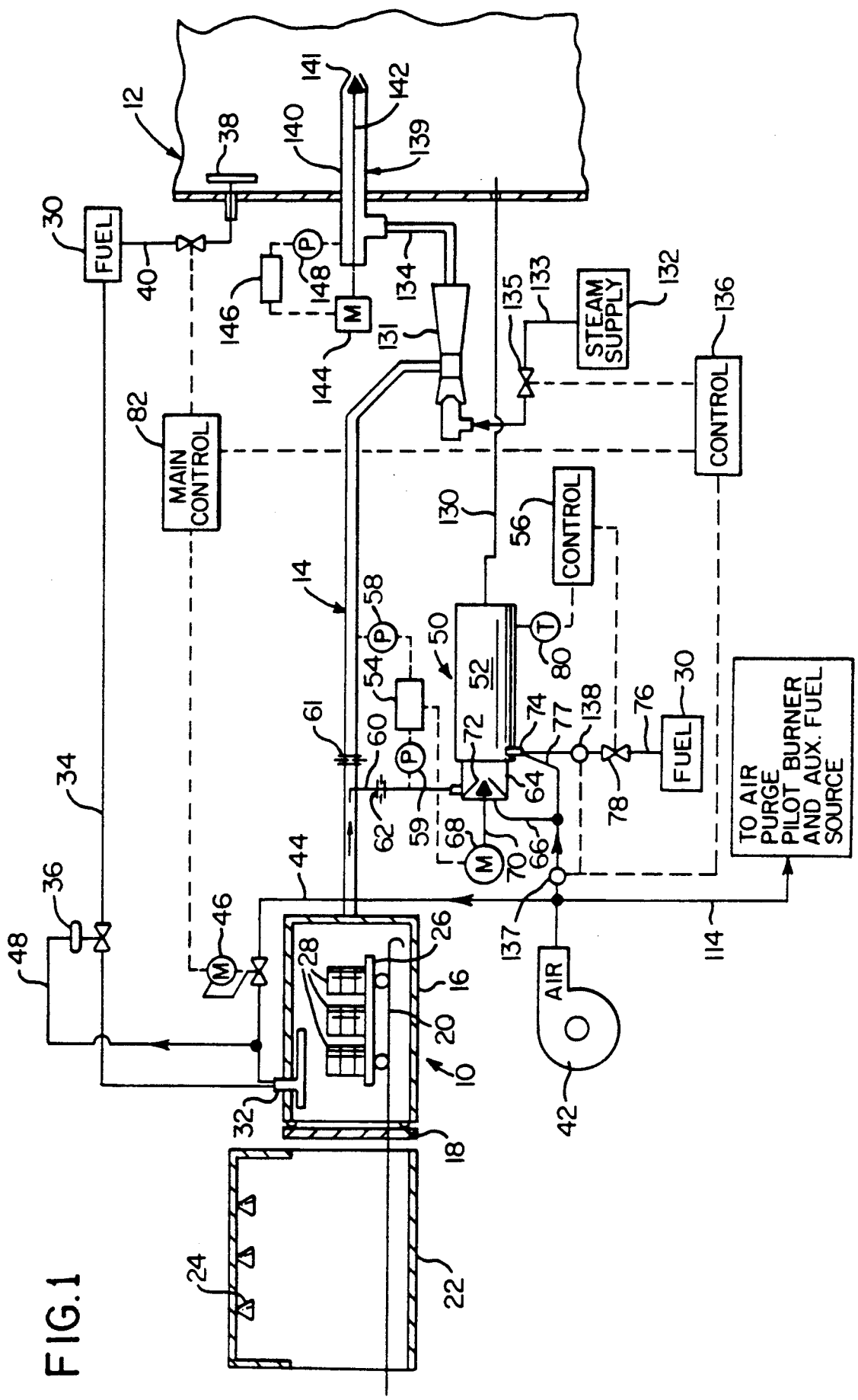
FIG. 1 is a schematic representation of a preferred embodiment of the pyrolyzer-kiln system of the present invention.

As shown in FIG. 1, the pyrolyzer-kiln system of the present invention includes a batch-type pyrolyzer, generally designated 10, a kiln, generally designated 12, and a conduit 14 connecting the pyrolyzer with the kiln. The kiln preferably is a rotary-type kiln for producing cement clinker. The pyrolyzer 10 includes a housing 16, a door 18, and a track 20. Positioned immediately adjacent to the pyrolyzer 10 and door 18 is a spray cooling chamber, generally designated 22.

The track 20 extends through the spray cooling chamber. The spray cooling chamber includes water jets 24. A car 26 is carried on the tracks 20 and supports steel barrels 28 of hazardous industrial waste or other carbonaceous material.

A source of fuel 30, such as natural gas, is connected to sidewall-fired burners 32 by a main fuel supply line 34. A pressure regulator 36 is mounted on the supply line 34. The fuel source 30 also supplies main heating fuel to a main kiln burner 38 through a supply line 40.

A combustion air blower 42 supplies combustion air to the burners 32 through supply line 44. An electric actuator control valve 46 is mounted on supply line 44, and a regulating line 48 actuates the pressure regulator 36 from a position downstream of temperature control valve 46.

The pyrolyzer-kiln system includes a closed-loop feedback control component, generally designated 50, for sampling, monitoring and controlling the heating value of the pyrolytic fume in the conduit 14. The control component 50 includes a calorimeter, generally designated 52, a pressure controller 54 and a temperature controller 56. The pressure controller 54 is connected to pressure sensors 58, 59, which are connected to the conduit 14 and a calorimeter feedline 60, respectively. The pressure sensor 58 is positioned downstream of an orifice 61 of a predetermined size, and pressure sensor 59 is positioned downstream of orifice 62 of a predetermined size.

The upstream end of the calorimeter 52 includes a variable area jet pump 64 which meters a predetermined amount of air into the calorimeter from a calorimeter air supply line 66. The controller 54 generates a signal to a position controller 68 which drives a pintle 70 which is positioned relative to an inlet orifice 72. The pintle 70 is positioned relative to the orifice 72 so that a sufficient amount of compressed air from blower 42 enters the calorimeter 52 to maintain a constant pressure differential reading between sensors 58, 60. Consequently, the flow of fume through supply line 62 will at all times be a constant proportion to the flow of the fume stream through conduit 14.

The calorimeter 52 also includes an auxiliary fuel burner 74 which is supplied with natural gas from fuel source 30 through supply line 76 and with combustion air through line 77. An electric actuator valve 78 is mounted on supply line 76 and is actuated by calorimeter temperature controller 56. Temperature controller 56, which operates independently of the other processes going on in the system, is connected to a temperature sensor 80 which senses the temperature within the calorimeter 52. The control 56 actuates the valve 78 to vary the amount of fuel mixture entering the burner 74 to maintain the temperature at a predetermined level. The air and fuel flow to the calorimeter 52 are measured by the control 56, which calculates the fume energy from the measurements by an algorithm.

The control 56 transmits a signal to main control 82 which is proportional to the value of the fume energy generated by the algorithm. Main control 82, which comprises a part of the closed-loop feedback component 50, is connected to electric actuator valve 46 and is capable of adjusting the flow of combustion air from blower 42 which is supplied to burner 32 through line 44. Simultaneously, the variations in the flow rate of combustion air through line 44 actuate pressure regulator 36 through line 48 to meter the flow of fuel to the burner 32 through line 34. As the flow rate of combustion air varies, the fuel flow through line 34 varies accordingly so that the proper air/fuel ratio is maintained at all flow rates. Accordingly, the main control 82, control 56 and calorimeter 52, which combine to form the closed-loop feedback component 50, maintain the heating value of the fume generated in the pyrolyzer 10 within a predetermined range.

Figure 2:
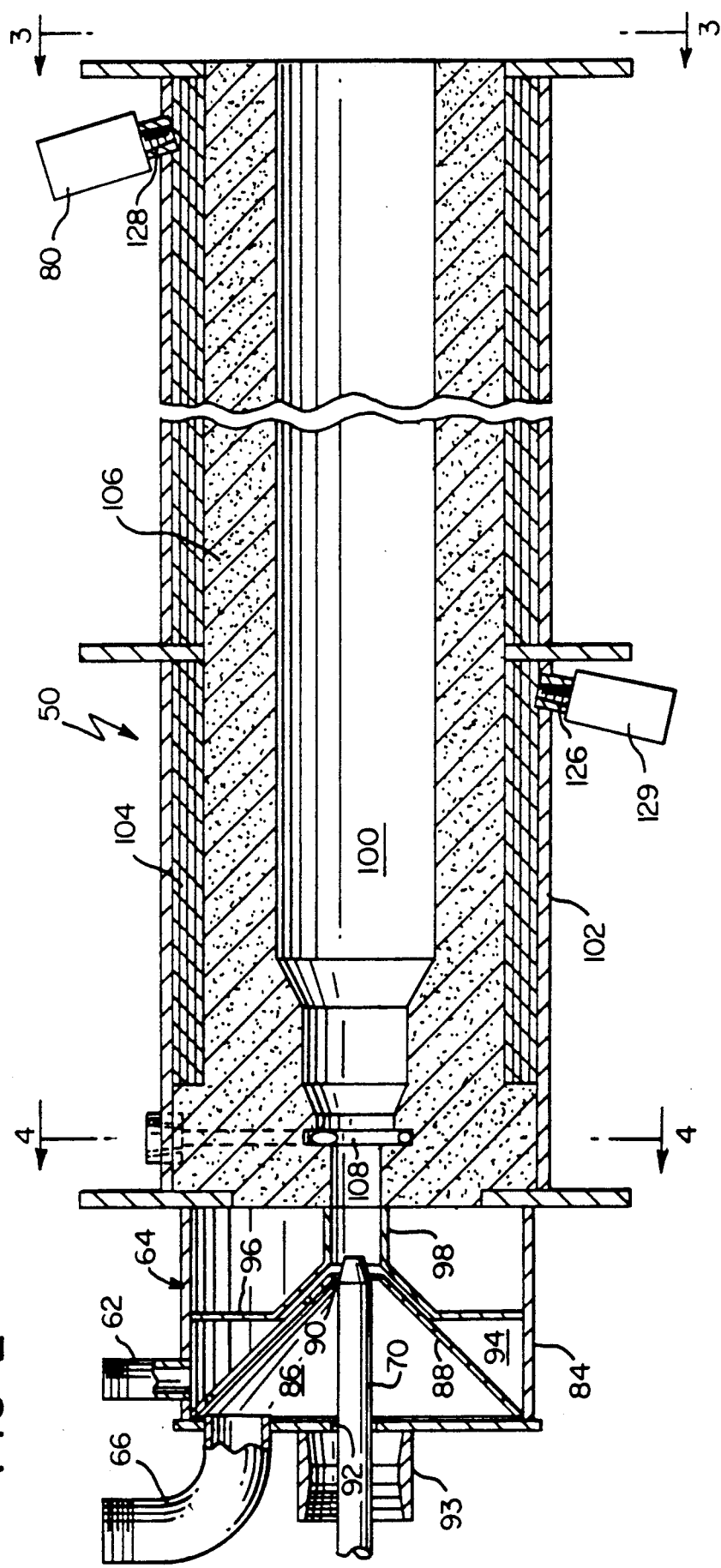
FIG. 2 is a somewhat schematic side elevation in section of the calorimeter of the pyrolyzer-kiln system of FIG. 1.

As shown in FIG. 2, the variable area jet pump 64 of the calorimeter 52 includes a chamber 84 which includes a conical wall 88 defining an air inlet chamber 86 which receives blower air from air supply line 66. The conical wall 88 includes a circular inner opening 90 in which is positioned the pintle 70. The pintle 70 passes through a front opening 92 in the chamber and through an airtight seal 93.

The chamber 84 also includes a fume sample inlet chamber 94 which communicates with the calorimeter feed line 62. The calorimeter inlet chamber 94 is defined by the conical wall 88 on one side, the wall of the chamber 84 about its periphery and a frusto-conical wall 96. Frusto-conical wall 96 includes an opening 98 into a residence chamber 100 of the calorimeter.

Figure 3:
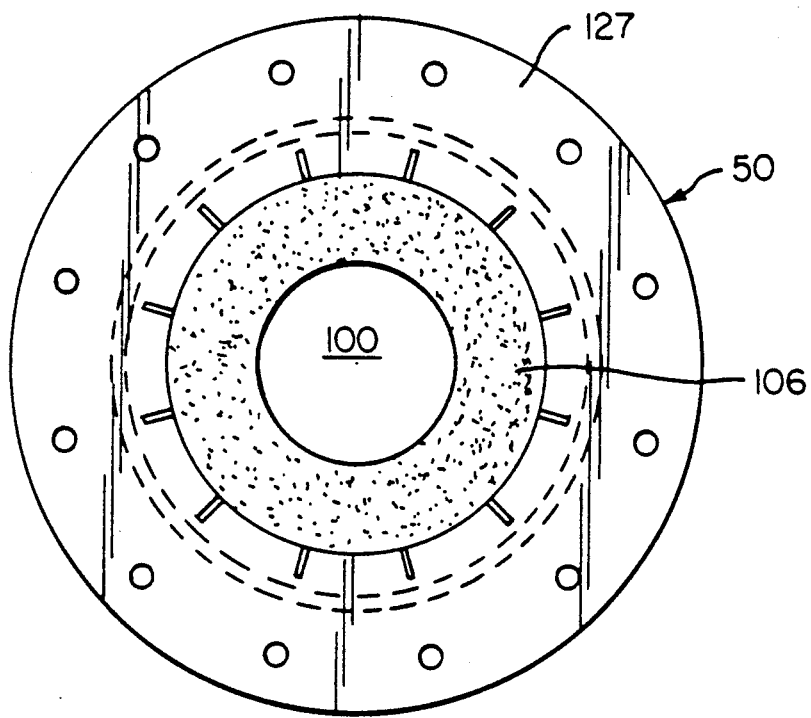
FIG. 3 is an end elevation of the calorimeter, taken at line 3—3 of FIG. 2.

As shown in FIGS. 2 and 3, the residence chamber 100 of the calorimeter 52 includes an outer cylindrical steel wall 102, an inner, cylindrical wall 104 of a ceramic fiber (such as Kaowool brand ceramic fiber manufactured by Babcock & Wilcox of Augusta, Georgia)

and an inner lining 106 of dense refractory material (such as Kaocrete brand dense refractory material manufactured by Babcock & Wilcox). The inner surfaces of the residence chamber are coated with a high-temperature insulation coating (such as Stalastic brand coating, manufactured by Witco Corp. of New York, N.Y.).

Figure 4:
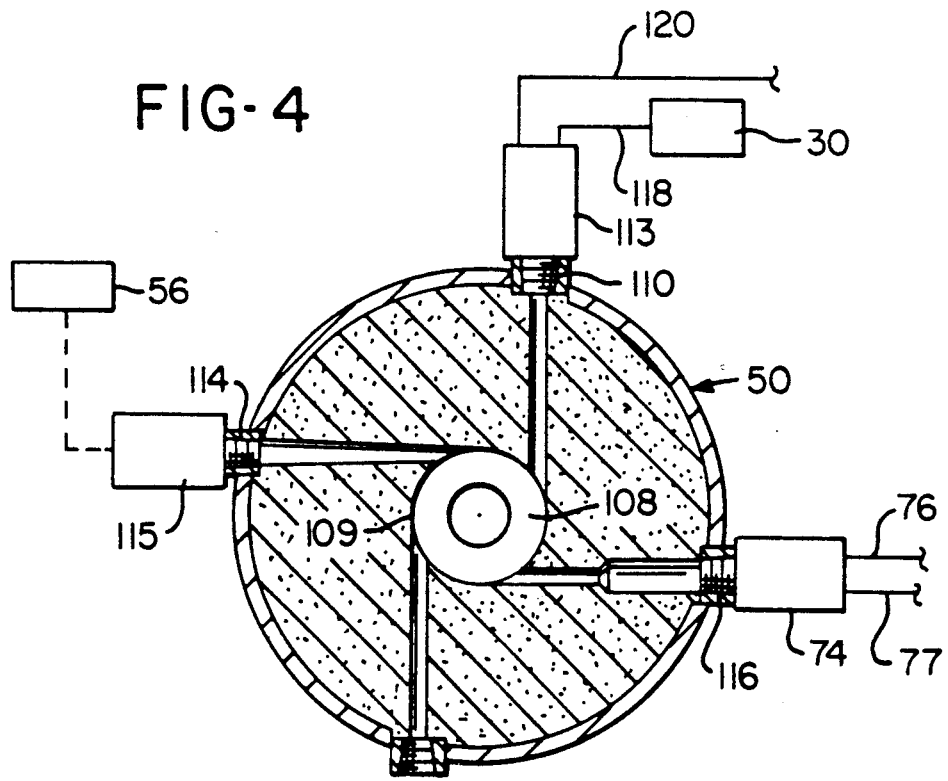
FIG. 4 is a sectional elevation of the calorimeter taken at line 4—4 of FIG. 2.

As shown in FIGS. 3 and 4, the forward portion of the residence chamber includes a "hot track" 108, also known as a ring of fire, for igniting the sample stream of fume/air mixture entering the residence chamber 100 from the jet pump 64. The ring of fire 108 includes an annular recess 109 and orifices 110, 112. Orifice 110 is connected to pilot burner 113 and positioned opposite to the pilot burner, orifice 112 receives a sight glass [not shown]. Burner 113 creates a "ring" of flame when fuel from said burners is ignited. Orifice 114 communicates with recess 109 and is connected to a flame sensor 115 which is connected to control 56. Orifice 116 communicates with recess 109 and is connected to an auxiliary fuel burner 74 which is supplied by gas supply line 76 and air line 77. Burner 113 is supplied by fuel line 118 and combustion air line 120 from fuel source 30 and blower 42, respectively.

As shown in FIG. 2, the residence chamber 100 includes orifices 126, 128 for mounting limit temperature sensor 129 and temperature sensor 80 (see FIG. 1).

As shown in FIG. 3, the end of the calorimeter 50 includes a connecting flange 127 which connects the residence chamber 100 to an exhaust line 130 (see FIG. 1) which conducts the burned fumes to the kiln 12. In an alternate embodiment not shown, the burned fumes may be directed to an exhaust duct of the spray chamber 22.

As shown in FIG. 1, a steam ejector pump 131 is positioned downstream of the calorimeter component 52 and is supplied by steam from a steam supply 132 through a conduit 133. The steam is injected under pressure into the ejector pump 131, and the mixture is conveyed through a conduit 134 to a nozzle within the kiln 12. The steam is supplied under pressure to draw the pyrolytic fume from the pyrolyzer 10 along the conduit 14. The steam pressure generated by the ejector pump 131 is regulated by a control valve 135 which is actuated by a control 136. Control 136 detects fume pressure within the pyrolyzer 10 by pyrolyzer pressure sensors (not shown). The fume pressure within the pyrolyzer is maintained within a predetermined range by the control 136 which varies the steam flow through the pump 131 by way of valve 135, thereby controlling the flow rate of fume through conduit 14. Controller 136 measures air and fuel flow through air supply line 66 and fuel supply line 76 by way of flow meters 137, 138 respectively on the air and fuel lines.

The nozzle 139 includes a housing 140 having an orifice 141 positioned within the kiln 12. A pintle 142 is moveably positioned within the housing 138 by an electrohydraulic servomotor 144. The servomotor 144 is actuated by a control 146 which is connected to a pressure sensor 148 positioned within the housing 138. The control 146 actuates the servomotor 144 to position the pintle 142 to maintain a constant pressure within the housing 138.

As shown in FIGS. 5 and 6, the housing 138 includes a jacket 150 made of a refractory material which encloses a steel tube 152. The pintle 142 is maintained in position within the housing 138 by supports 154, 156. The pintle 142 is cooled by a series of internal passages 158 which receive steam from a flexible steam supply line 160.

The rear wall 162 of the chamber includes an orifice 164 which is pressure tight such that the fume is retained within the housing 138 to exit the orifice 140. The electrohydraulic servomotor 144 (see FIG. 1) is attached to a base plate 166 of the pintle 142.

The operation of the pyrolyzer-kiln system is as follows. The process begins when the door 18 of the pyrolyzer 10 is raised to allow a car 26 carrying drums 28 of hazardous organic waste material to enter the pyrolyzer on track 20. The door 18 is closed, an the burner 32 actuated to heat the contents of the pyrolyzer 10 to drive off combustible fume. The fume is conveyed through conduit 14 by the steam ejector pump 128 to the burner 136 at the kiln 12.

Optionally, the pyrolyzer 10 may be a continuous-type pyrolyzer in which the waste is fed in by conveyer. Use of such a continuous-type pyrolyzer would not require modification of the rest of the system.

As the fume travels along the conduit 14, a portion of the slipstream is continuously drawn off and sampled by the calorimeter 52. The portion is drawn through calorimeter feedline 62 by action of the jet pump 64 such that the portion removed is a constant ratio to the volume of fume stream flowing through the conduit 14. The air from blower 42 which powers the jet pump 64 forces the fume to mix with it and travel along the length of the calorimeter housing 52. The mixture is ignited by burners 113 as it passes through the ring of fire 108 and is mixed with auxiliary fuel and air flowing continuously into the ring of fire 108 through the burner 74.

The temperature within the calorimeter is monitored by temperature sensor 80, and control 56 actuates valve 78 to vary the flow rate of fuel to the burner 74 to maintain the temperature constant. A signal is generated by the control 56 to main control 82 which varies the amount of supply air through line 44 to the pyrolyzer 10. The amount of supply air also actuates valve 36 to control the amount of natural gas fuel supplied to the burner 32 through supply line 34. The temperature within the pyrolyzer 10 is varied in response to a signal from the control 136, which monitors the air and fuel flow from the blower 42 and fuel source 30 to the calorimeter 52 by way of flow meters 137, 138.

As the mixture of steam and fume enter through the burner 139 to kiln 12, the flame shape is maintained by the electrohydraulic servomotor 144 which positions the pintle 142 within the burner 139 to maintain a constant pressure within the burner housing 140.

When the material within the drums 28 is pyrolyzed, the pyrolyzer is cooled by injecting steam, and the door 18 opened to allow the car 26 to be removed to the spray chamber 22 where spray jets 24 further cool the drums and car. The char resulting from the pyrolysis optionally may be blown into the kiln with conventional fuel, such as coal.

While the form of apparatus herein described constitutes a preferred embodiment of this invention, it is to be understood that the invention is not limited to this precise form of apparatus, and that changes may be made therein without departing from the scope of the invention.

What is claimed is:

1. A pyrolyzer-kiln system comprising:
   means for pyrolyzing material to generate a combustible fume;
   kiln means for burning said fume as part of a kiln process;

conduit means for conveying said fume from said pyrolyzing means to said kiln means for combustion therein; and means for continuously drawing off a predetermined, proportional sample of said fume prior to entry thereof into said kiln, combusting said sample to determine a heating value thereof and for controlling operating parameters of said pyrolyzing means in response to said determined heating value such that said heating value is maintained within a predetermined range of values, whereby a rate of supply of heat energy to said kiln means by burning said fume therein is substantially constant.

2. The system of claim 1 wherein said sensing and controlling means includes calorimeter means for sensing heating values of said fume within said conduit means.

3. The system of claim 2 wherein said sensing and controlling means includes a control for sensing conditions within said calorimeter means and varying operating parameters of said pyrolyzing means in response thereto.

4. The system of claim 2 wherein said calorimeter means includes a supply air inlet; means for drawing off a portion of said fume from said conduit means; means for combining said air and said fume to form a mixture; means for supplying auxiliary fuel to said mixture; means for igniting a combination of said fuel and said mixture; and means for measuring a temperature of said ignited combination of said fuel and said mixture.

5. The system of claim 4 wherein said calorimeter means includes flow balancing means for maintaining a flow rate of said fume through said calorimeter at a constant proportion to a flow rate of said fume stream through said conduit means.

6. The system of claim 1 further comprising means for maintaining a predetermined flame shape as said fume is burned in said kiln means.

7. A pyrolyzer-kiln system comprising:
means for pyrolyzing material to generate a combustible fume;
kiln means for burning said fume as part of a kiln process;
conduit means for conveying said fume from said pyrolyzing means to said kiln means for combustion therein;
means for sensing a heating value of said fume prior to entry thereof into said kiln and for controlling operating parameters of said pyrolyzing means in response thereto such that said heating value is maintained within a heat energy to said kiln means by burning said fume therein is substantially constant;
said sensing and controlling means including
calorimeter means for sensing heating values of said fume within said conduit means, said calorimeter means including a supply air inlet, means for drawing off a portion of said fume from said conduit means, means for combining said air and said fume to form a mixture, means for supplying auxiliary fuel to said mixture and means for igniting a combination of said fuel and said mixture and means for measuring a temperature of said ignited combination of said fuel and said mixture; and
first control means for metering said fuel at a predetermined rate to said calorimeter such that a temperature therein is maintained within a predetermined range.

8. The system of claim 7 wherein said sensing and controlling means includes second control means for varying operational parameters of said pyrolyzer means in response to a signal from said first control means indicative of a feed rate of said fuel, whereby heating value of said fume generated within said kiln is affected.

9. The system of claim 8 wherein one of said operational control parameters is a feed rate of pyrolyzer fuel to said pyrolyzer means.

10. The system of claim 7 wherein said first control means includes means for modulating a main fuel flow to said kiln means in response to variations in heating value of said fume, whereby a temperature within said kiln is maintained substantially constant.

11. A pyrolyzer-kiln system comprising:
means for pyrolyzing material to generate a combustible fume;
kiln means for burning said fume as part of a kiln process;
conduit means for conveying said fume from said pyrolyzing means to said kiln means for combustion therein;
means for sensing a heating value of said fume prior to entry thereof into said kiln and for controlling operating parameters of said pyrolyzing means in response thereto such that said heating value is maintained within a predetermined range of values, whereby a rate of supply of heat energy to said kiln means by burning said fume therein is substantially constant; and
means for maintaining a predetermined flame shape as said pyrogas is burned in said kiln means, said flame shape maintaining means including burner pipe means having a cylindrical housing with a hollow interior communicating with said conduit means and an open end positioned within said kiln, pintle means positioned within said housing and means for positioning said pintle within said housing, thereby varying an effective area of said opening.

12. The system of claim 11 further including control means for measuring a pressure of said fume within said housing, and means, associated with said measuring control means, for positioning said pintle means relative to said opening to vary said effective area of said opening and thereby maintain said pressure within predetermined limits, whereby a desired flame shape of said burning fume is maintained.

13. The system of claim 12 wherein said positioning means includes an electrohydraulic servo motor for displacing said pintle means with respect to said housing.

14. A pyrolyzer kiln system comprising:
means for pyrolyzing material to generate a combustible fume;
kiln means for burning said fume in a kiln process and generating cement clinker;
conduit means for conveying said fume in a slip stream from said pyrolyzing means to said kiln means; and
means for maintaining a predetermined flame shape as said fume stream is burned in said kiln means.

15. A pyrolyzer kiln system comprising:
means for pyrolyzing material to generate a combustible fume;
kiln means for burning said fume in a kiln process and generating cement clinker;

conduit means for conveying said fume in a slip stream from said pyrolyzing means to said kiln means; and means for maintaining a predetermine flame shape as said fume stream is burned in said kiln means, said flame shape maintaining means including a burner pipe having a cylindrical housing with a hollow interior communicating with said conduit means and an open end positioned within said kiln, pintle means positioned within said housing and means for positioning said pintle within said housing, thereby varying an effective area of said opening.

16. The system of claim 15 further including control means for measuring a pressure of said fume stream across said opening, and means, associated with said measuring means, for positioning said pintle means relative to said opening to vary said effective area of said opening and thereby maintain said pressure differential across said opening within predetermined limits, whereby a desired flame shape of said burning fume is maintained.

17. The system of claim 16 wherein said positioning means includes an electrohydraulic servomotor for displacing said pintle means with respect to said housing.

18. A pyrolyzer kiln system comprising:
a pyrolyzer for generating a combustible fume;
a kiln having first burner means for burning said fume and second burner means for burning other fuel in a kiln process;
a conduit extending between said pyrolyzer and said kiln for conveying fume in a slip stream from said pyrolyzer to said kiln;
a steam ejector pump positioned on said conduit for drawing said fume from said pyrolyzer to said kiln;
a calorimeter mounted on said conduit for measuring a heating value of said fume stream, said calorimeter including a housing, a jet pump for supplying air to said housing under pressure, a fume supply line extending from said conduit to said housing for drawing a sample stream of fume from said conduit, a fume sample inlet chamber for mixing said supply air and said fume, an auxiliary fuel supply connected to said housing to mix with said mixture of fume and supply air, a burner within said housing for burning said mixture of air, fume and auxiliary fuel, a temperature sensor for sensing a temperature of said mixture of air, fume and auxiliary fuel as it is burned, an exhaust tube extending from said chamber downstream of said burner and temperature sensor for conveying said burned mixture from said chamber to said conduit, a first control detecting a pressure of said fume slip stream within said conduit and detecting a pressure of said fume within said fume supply line and maintaining a constant pressure differential there between, a second control for receiving a signal from said temperature sensor, varying a supply of said calorimeter fuel to said chamber to maintain a temperature therein within a predetermined range and generating a signal responsive to said calorimeter fuel flow rate, and a third control for modifying operational parameters of said pyrolyzer in response to said signal, whereby said fume stream is maintained within a predetermined range of heating values.

19. A fuel supply system for a kiln comprising:
means for generating a combustible gas having a heating value within a first predetermined range;
conduit means for conveying said gas to a kiln for burning;
means, associated with said conduit means, for proportionally sampling said gas in said conduit, detecting said heating value of said gas and varying operational parameters of said generating means to maintain said heating value within a second predetermined range within said first predetermined range.

20. The system of claim 19 wherein said detecting means includes a calorimeter.

21. The system of claim 20 wherein said calorimeter continuously draws sample gas from said gas conveyed through said conduit means at a rate which is a fixed proportion to a flow rate of said gas, whereby heating value of said gas is monitored continuously as said gas flows through said conduit means.

22. A pyrolyzer-kiln system comprising:
means for pyrolyzing material to form a combustible fume;
kiln means for heating material in a kiln process and for burning said fume to generate heat;
conduit means for conveying said fume in a stream from said pyrolyzer means to said kiln means for burning therein; and
closed-loop feedback means, separate from said kiln means, for determining, on a continuous basis, a heating value of a proportional sample of said fume stream and varying operational parameters of said pyrolyzing means to maintain said heating value within a predetermined range.

23. The system of claim 22 wherein said feedback means includes a calorimeter; means for drawing a sample of said fume stream at a constant proportion thereto and conveying said sample to said calorimeter; means for mixing said sample with auxiliary fuel and burning said mixture; and control means for measuring a temperature of said burned mixture and varying an amount of auxiliary fuel to be added to maintain said temperature within a predetermined range.

24. A pyrolyzer-kiln system comprising:
means for pyrolyzing material to form a combustible fume;
kiln means for heating material in a kiln process and for burning said fume to generate heat;
conduit means for conveying said fume in a stream from said pyrolyzer means to said kiln means for burning therein; and
closed-loop feedback means, separate from said kiln means, for determining, on a continuous basis, a heating value of said fume stream and varying operational parameters of said pyrolyzing means to maintain said heating value within a predetermined range, said feedback means including a calorimeter, means for drawing a sample of said fume stream at a constant proportion thereto and conveying said sample to said calorimeter, means for drawing a sample of said fume stream at a constant proportion thereto and conveying said sample to said calorimeter, means for mixing said sample with auxiliary fuel and burning said mixture and control means for measuring a temperature of said burned mixture and varying an amount of auxiliary fuel to be added to maintain said temperature within a predetermined range;
said sample drawing means including a variable area jet pump for injecting air under pressure to said calorimeter and flowing said sample of fume from said conduit means at a predetermined rate, said jet pump including an air inlet chamber for receiving air under pressure and including an orifice, a pintle, means for positioning said pintle relative to said orifice to vary air flow to said calorimeter, and a fume sample inlet chamber communicating with said conduit and positioned downstream of and in communication with said air inlet chamber and an interior of said calorimeter, whereby air entering said calorimeter through said air inlet chamber draws a fume sample from said conduit through said fume sample inlet chamber to mix with said air and enter said calorimeter interior as a sample stream.

25. The system of claim 24 wherein said auxiliary fuel mixing means includes a hot track having an annular recess positioned downstream of said fume sample inlet chamber and oriented normal to a flow of said sample stream; a pilot burner positioned to generate an annular jet of flame in said recess to ignite said sample stream; and an auxiliary fuel burner to supply said auxiliary fuel and air mixture to said calorimeter to be burned with said sample stream.

26. The system of claim 25 wherein said control means includes means for varying an operational temperature within said pyrolyzing means in response to an amount of said auxiliary fuel required to maintain said calorimeter temperature within said predetermined range.

27. The system of claim 24 wherein said sample drawing means includes an orifice of predetermined size in said conduit means; first pressure sensor means for measuring a pressure of said fume stream downstream of said orifice; a feed line for conveying said fume sample to said calorimeter from said conduit means; second pressure sensor means for measuring a pressure of said fume sample in said feed line; and said control means, responsive to said first and second pressure sensor means, includes means for positioning said pintle within said jet pump to maintain a pressure within said feed line at a predetermined ratio with said pressure of said fume stream downstream of said orifice.

28. A method of supplying combustible fume from waste material to a kiln, the method comprising the steps of:
pyrolyzing said waste material within a pyrolyzer to generate a combustible fume;
drawing said fume from said pyrolyzer and conveying said fume in a stream to said kiln;
burning said fume stream in said kiln to generate heat energy; and
proportionally sampling said fume stream, detecting a heating value of said fume therefrom and adjusting operating parameters of said pyrolyzer in response thereto such that said heating value is maintained within predetermined limits.

29. The method of claim 28 wherein said sampling step includes the step of adjusting a temperature at which said pyrolyzing step is performed.

30. A method of supplying combustible fume from waste material to a kiln, the method comprising the steps of:
pyrolyzing said waste material within a pyrolyzer to generate a combustible fume;
drawing said fume from said pyrolyzer and conveying said fume in a stream to said kiln;
burning said fume stream in said kiln to generate heat energy; and
sampling said fume stream, detecting a heating value of said fume therefrom and adjusting operating parameters of said pyrolyzer in response thereto such that said heating value is maintained within predetermined limits, said sampling step including
continuously drawing off a predetermined proportion of said fume steam as a fume sample,
mixing said fume sample with auxiliary fuel at a predetermined rate to form a sample mixture,
burning said sample mixture and measuring a temperature thereof and
modifying said rate said auxiliary fuel is mixed with said fume sample such that said temperature is maintained within predetermined limits.

31. The method of claim 30 wherein said continuous drawing step includes the steps of:
measuring a pressure of said fume stream;
measuring a pressure of said fume sample;
directing said fume sample into a calorimeter by a variable area jet pump of air; and
varying a flow rate of said air from said jet pump such that said fume sample pressure is maintained at a constant ratio to said fume stream pressure.

32. A method of supplying combustible fume from waste material to a kiln, the method comprising the steps of:
placing containers of waste material into a pyrolyzer;
heating said material in the absence of oxygen sufficiently to create a combustible fume;
conveying said fume in a fume stream from said pyrolyzer to a cement kiln by ejector pump means;
continuously drawing off a sample fume from said fume stream at a predetermined pressure differential relative to said fume stream;
mixing said sample fume with air from a variable area jet pump such that said sample fume is maintained at said predetermined pressure differential;
mixing said sample fume with auxiliary fuel to form a sample mixture, and burning said sample mixture in a calorimeter;
measuring a temperature of said burning mixture and varying a flow rate of said auxiliary fuel to said calorimeter such that said temperature is maintained within predetermined limits;
varying a temperature within said pyrolyzer in direct proportion to a flow rate of said auxiliary fuel, whereby a heating value of said fume in said fume stream is maintained within predetermined limits; and
burning said fume stream in said kiln.

33. A pyrolyzer-kiln system comprising:
means for pyrolyzing material to generate a combustible fume;
kiln means for burning said fume as part of a kiln process;
conduit means for conveying said fume from said pyrolyzing means to said kiln means for combustion therein;
means for sensing a heating value of said fume prior to entry thereof into said kiln and for controlling operating parameters of said pyrolyzing means in response thereto such that said heating value is maintained within a predetermined range of values, whereby a rate of supply of heat energy to said kiln means by burning said fume therein is substantially constant; and
steam ejector pump means for drawing said fume from said pyrolyzing means to said kiln means.

34. A pyrolyzer-kiln system comprising:
means for pyrolyzing material to generate a combustible fume;
kiln means for burning said fume as part of a kiln process;
conduit means for conveying said fume from said pyrolyzing means to said kiln means for combustion therein; and
stream ejector pump means, operatively connected to said conduit means, for drawing said fume from said pyrolyzing means, along said conduit means, to said kiln means.

35. The system of claim 34 further comprising control means for sensing a fume pressure within said pyrolyzing means and adjusting a flow rate of steam through said pump means in response to said fume pressure, whereby said fume pressure is maintained within predetermined limits.

* * * * *